(12) United States Patent
Attebery et al.

(10) Patent No.: US 10,024,062 B2
(45) Date of Patent: *Jul. 17, 2018

(54) BUILDING VENEER SYSTEM

(71) Applicant: Talus Systems, LLC, Centennial, CO (US)

(72) Inventors: Harold C. Attebery, Granville, OH (US); Neal Sugarman, Denver, CO (US)

(73) Assignee: Talus Systems, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,872

(22) Filed: Jun. 12, 2017

(65) Prior Publication Data

US 2017/0342722 A1    Nov. 30, 2017

Related U.S. Application Data

(63) Continuation of application No. 14/516,572, filed on Oct. 16, 2014, now Pat. No. 9,677,283, which is a
(Continued)

(51) Int. Cl.
*E04F 13/00* (2006.01)
*E04F 13/24* (2006.01)
(Continued)

(52) U.S. Cl.
CPC .......... *E04F 13/007* (2013.01); *E04B 1/5837* (2013.01); *E04B 1/625* (2013.01);
(Continued)

(58) Field of Classification Search
CPC ................... E04B 1/5837; E04B 1/625; E04B 2001/5887; E04F 13/007; E04F 13/0835;
(Continued)

(56) References Cited

U.S. PATENT DOCUMENTS 495,572 A    4/1893  Warnstorf
663,770 A   12/1900  Messerli
(Continued)

OTHER PUBLICATIONS

U.S. Appl. No. 14/420,143, filed Mar. 14, 2014.
(Continued)

*Primary Examiner* — James M Ference
(74) *Attorney, Agent, or Firm* — Lewis Brisbois Bisgaard & Smith LLP

(57) ABSTRACT

A veneer product and system includes a body having an aesthetic front surface and a back surface for installation adjacent the building. The body has a top side and a bottom side and a bracket attached to body and projecting away from the back surface of the body, the bracket further comprising a first end adjacent the top side for attachment to the building and a first protrusion for positioning the back surface a predetermined distance from the building and a second end having a second protrusion for positioning the bottom of the back surface a predetermined distance from the building and a bottom projection adjacent the bottom side for engagement with a second body to retain the bottom end of the veneer product.

23 Claims, 8 Drawing Sheets

Related U.S. Application Data continuation-in-part of application No. 13/420,143, filed on Mar. 14, 2012, now Pat. No. 9,587,398.

(60) Provisional application No. 61/453,498, filed on Mar. 16, 2011.

(51) Int. Cl.
  *E04F 13/08* (2006.01)
  *E04F 13/14* (2006.01)
  *E04B 1/58* (2006.01)
  *E04B 1/62* (2006.01)
  *E04F 13/22* (2006.01)

(52) U.S. Cl.
  CPC ...... *E04F 13/0835* (2013.01); *E04F 13/0871* (2013.01); *E04F 13/14* (2013.01); *E04F 13/141* (2013.01); *E04F 13/147* (2013.01); *E04F 13/22* (2013.01); *E04F 13/24* (2013.01); *E04B 2001/5887* (2013.01)

(58) Field of Classification Search
  CPC ..... E04F 13/0871; E04F 13/14; E04F 13/141; E04F 13/147; E04F 13/22; E04F 13/24
  See application file for complete search history.

(56) References Cited

U.S. PATENT DOCUMENTS

| | | |
|---|---|---|
| 1,946,732 A | 2/1934 | Danielson |
| 2,011,510 A | 8/1935 | Ackenbrack |
| 2,823,399 A | 2/1958 | Stewart |
| 2,924,963 A | 2/1960 | Taylor et al. |
| 3,142,938 A | 8/1964 | Eberhardt |
| 3,277,626 A | 10/1966 | Brynjolfsson et al. |
| 3,377,764 A | 4/1968 | Storch |
| 3,533,206 A | 10/1970 | Passeno, Jr. |
| 3,621,625 A | 11/1971 | Medow |
| 3,964,226 A | 6/1976 | Hala et al. |
| 4,160,346 A | 7/1979 | Kaufmann |
| 4,251,578 A | 2/1981 | Kaufmann |
| 4,287,241 A | 9/1981 | Kaufmann |
| 4,386,136 A | 5/1983 | Kaufmann |
| 4,765,115 A | 8/1988 | Pollina |
| 4,803,821 A * | 2/1989 | Funaki ............... E04F 13/0862 52/387 |
| 4,819,401 A | 4/1989 | Whitney, Jr. |
| 4,843,776 A | 7/1989 | Guignard |
| 4,852,320 A | 8/1989 | Ballantyne |
| 4,866,896 A * | 9/1989 | Shreiner ............... E04F 13/081 52/235 |
| 4,869,038 A | 9/1989 | Catani |
| 4,953,337 A | 9/1990 | Mills |
| 4,987,712 A * | 1/1991 | Mancuso ............ E04F 13/0862 52/387 |
| 4,992,005 A | 2/1991 | Hilfiker |
| 5,062,913 A | 11/1991 | Owens et al. |
| 5,208,086 A | 5/1993 | Owens |
| 5,228,937 A | 7/1993 | Passeno |
| 5,265,396 A | 11/1993 | Amimoto |
| 5,314,554 A | 5/1994 | Owens |
| 5,373,676 A | 12/1994 | Francis et al. |
| 5,392,581 A | 2/1995 | Hatzinikolas et al. |
| 5,454,200 A | 10/1995 | Hohmann |
| 5,490,366 A | 2/1996 | Burns et al. |
| 5,501,049 A | 3/1996 | Francis et al. |
| 5,555,690 A | 9/1996 | Cosentino |
| 5,634,305 A * | 6/1997 | Erlanger ................ E04B 2/86 52/235 |
| 5,634,307 A | 6/1997 | Larriberot et al. |
| 5,634,310 A | 6/1997 | Hohmann |
| 5,671,578 A | 9/1997 | Hohmann |
| 5,816,008 A | 10/1998 | Hohmann |
| 5,836,572 A | 11/1998 | Sugiyama |
| 6,164,029 A | 12/2000 | Lee |
| 6,170,214 B1 | 1/2001 | Treister et al. |
| 6,209,281 B1 | 4/2001 | Rice |
| 6,279,283 B1 | 8/2001 | Hohmann et al. |
| 6,315,489 B1 | 11/2001 | Watanabe |
| 6,351,922 B1 | 3/2002 | Burns et al. |
| 6,615,560 B2 | 9/2003 | Ito |
| 6,668,505 B1 | 12/2003 | Hohmann et al. |
| 6,789,365 B1 | 9/2004 | Hohmann et al. |
| 6,830,405 B2 | 12/2004 | Watanabe |
| 6,851,239 B1 | 2/2005 | Hohmann et al. |
| 6,913,645 B2 | 7/2005 | McNulty, Jr. |
| D510,146 S | 9/2005 | Attebery, II et al. |
| 6,941,717 B2 | 9/2005 | Hohmann et al. |
| 7,017,318 B1 | 3/2006 | Hohmann et al. |
| RE39,091 E | 5/2006 | Kuelker |
| 7,159,367 B1 | 1/2007 | King |
| 7,225,590 B1 | 6/2007 | deGirolamo et al. |
| 7,325,366 B1 | 2/2008 | Hohmann, Jr. et al. |
| 7,736,096 B1 | 6/2010 | Aaron |
| 8,033,069 B2 | 10/2011 | Hotchkiss, III |
| 8,122,663 B1 | 2/2012 | Hohmann, Jr. et al. |
| 8,151,530 B2 | 4/2012 | Schwarz et al. |
| 8,387,323 B2 | 3/2013 | Mickelson |
| 8,667,757 B1 | 3/2014 | Hohmann, Jr. |
| 8,726,596 B2 | 5/2014 | Hohmann, Jr. |
| 8,782,988 B2 | 7/2014 | Wolf et al. |
| 8,833,003 B1 | 9/2014 | Hohmann, Jr. |
| 9,021,767 B1 | 5/2015 | Barrett, Jr. et al. |
| 9,027,302 B2 | 5/2015 | Buoni et al. |
| 9,249,579 B2 | 2/2016 | Dickey et al. |
| 2001/0054270 A1 | 12/2001 | Rice |
| 2002/0046536 A1 | 4/2002 | Hotta |
| 2003/0066259 A1 | 4/2003 | Sudweeks |
| 2003/0213212 A1 | 11/2003 | Passeno |
| 2004/0040239 A1 | 3/2004 | Baillargeon |
| 2004/0216408 A1 | 11/2004 | Hohmann |
| 2005/0087908 A1 | 4/2005 | Nast et al. |
| 2005/0102944 A1 | 5/2005 | Hikai |
| 2005/0188642 A1 | 9/2005 | Correia |
| 2005/0210811 A1 | 9/2005 | Nasvik |
| 2005/0217192 A1 | 10/2005 | Boosy |
| 2006/0005490 A1 | 1/2006 | Hohmann |
| 2006/0026919 A1 | 2/2006 | Morse et al. |
| 2006/0101752 A1 | 5/2006 | Sakai et al. |
| 2006/0265988 A1 | 11/2006 | Fujito et al. |
| 2006/0272261 A1 | 12/2006 | Ito |
| 2007/0045897 A1 | 3/2007 | Alexander et al. |
| 2007/0062138 A1 | 3/2007 | Wobber |
| 2007/0078191 A1 | 4/2007 | Guhde et al. |
| 2007/0119109 A1 | 5/2007 | Kuelker |
| 2007/0130860 A1 | 6/2007 | Paquette et al. |
| 2007/0209308 A1 | 9/2007 | Barrett |
| 2008/0141605 A1 | 6/2008 | Hohmann |
| 2008/0155921 A1 | 7/2008 | Wolf |
| 2008/0155922 A1 | 7/2008 | Wolf et al. |
| 2008/0155938 A1 * | 7/2008 | Attebery ............... E04C 2/044 52/747.12 |
| 2008/0196336 A1 * | 8/2008 | Attebery ............... E04B 2/707 52/235 |
| 2008/0196354 A1 * | 8/2008 | Attebery ............... E04B 2/707 52/782.1 |
| 2009/0094914 A1 | 4/2009 | Jambois et al. |
| 2009/0113837 A1 | 5/2009 | Mickelson |
| 2009/0133357 A1 | 5/2009 | Richards |
| 2009/0193742 A1 | 8/2009 | Wolf et al. |
| 2009/0241451 A1 | 10/2009 | Griffiths |
| 2010/0257803 A1 | 10/2010 | Hohmann |
| 2011/0047919 A1 | 3/2011 | Hohmann |
| 2011/0061333 A1 | 3/2011 | Bronner |
| 2011/0094176 A1 | 4/2011 | Bronner |
| 2011/0146195 A1 | 6/2011 | Hohmann |
| 2011/0173902 A1 | 7/2011 | Hohmann et al. |
| 2011/0175255 A1 | 7/2011 | Wernette et al. |
| 2011/0277397 A1 | 11/2011 | Hohmann |
| 2012/0186183 A1 | 7/2012 | Johnson, III |
| 2012/0241574 A1 | 9/2012 | Uota et al. |
| 2012/0291390 A1 | 11/2012 | Hohmann, Jr. |
| 2012/0304576 A1 | 12/2012 | Hohmann |

(56) References Cited

U.S. PATENT DOCUMENTS

| | | |
|---|---|---|
| 2013/0074435 A1 | 3/2013 | Hohmann, Jr. |
| 2013/0074442 A1 | 3/2013 | Hohmann |
| 2013/0232893 A1 | 9/2013 | Hohmann |
| 2013/0232909 A1 | 9/2013 | Curtis et al. |
| 2013/0247482 A1 | 9/2013 | Hohmann, Jr. |
| 2013/0247483 A1 | 9/2013 | Hohmann |
| 2013/0247484 A1 | 9/2013 | Hohmann |
| 2013/0247498 A1 | 9/2013 | Hohmann |
| 2013/0340378 A1 | 12/2013 | Hohmann |
| 2014/0000211 A1 | 1/2014 | Hohmann |
| 2014/0041331 A1 | 2/2014 | Buoni et al. |
| 2014/0075855 A1 | 3/2014 | Hohmann |
| 2014/0075856 A1 | 3/2014 | Hohmann |
| 2014/0260033 A1 | 9/2014 | Hohmann |
| 2014/0260040 A1 | 9/2014 | Hohmann |
| 2014/0260051 A1 | 9/2014 | Hohmann |
| 2014/0311071 A1 | 10/2014 | Curtis et al. |
| 2016/0108623 A1* | 4/2016 | Attebery, II ......... E04F 13/007 52/302.1 |

OTHER PUBLICATIONS

U.S. Appl. No. 15/449,525, filed Mar. 3, 2017.
U.S. Appl. No. 14/516,572, filed Oct. 16, 2014.
"Installation Guide," Masonry Veneer Manufacturers Association, 2009, retrieved from https://web.archive.org/web/*/http://www.masonryveneer.org/pdf/MVMAManualDesign-web.pdf, 48 pages.
"Versetta Stone," Boral Stone Products, retrieved from https://web.archive.org/web/20110513164732/http://masonry.owenscorning.com/versettastone; 12 pages.
"Welcome to Cosella-Dorken," Cosella-Dorken Products, Inc., 2011, retrieved from https://web.archive.org/web/20110723005431/http://www.cosella-dorken.com/bvf-ca-en/index.php, 1 pages.
Notice of Allowance for U.S. Appl. No. 13/420,143, dated Oct. 24, 2016, 5 pages.
Official Action for U.S. Appl. No. 13/420,143, dated Sep. 22, 2016, 11 pages.
Final Action for U.S. Appl. No. 14/516,572, daed Nov. 10, 2016, 15 pages.
Official Action for U.S. Appl. No. 14/516,572, dated Jun. 13, 2016, 30 pages.

* cited by examiner

BUILDING VENEER SYSTEM

This Application is a continuation of U.S. patent application Ser. No. 14/516,572, filed Oct. 16, 2014, now U.S. Pat. No. 9,677,283, issued Jun. 13, 2017, which is a continuation-in-part of U.S. patent application Ser. No. 13/420,143, filed Mar. 14, 2012, now U.S. Pat. No. 9,587,398, issued Mar. 7, 2017, which claims the benefit of U.S. Provisional Patent Application Ser. No. 61/453,498, filed Mar. 16, 2011, the entireties of which are incorporated by reference herein.

FIELD OF THE INVENTION

The present invention is in the technical field of masonry veneer products, and includes a system using such products. More particularly, the present invention is in the technical field of masonry veneer products installed without a scratch coat and lath system.

BACKGROUND OF THE INVENTION

As described in copending U.S. patent application Ser. No. 13/420,142, which is incorporated herein by reference in its entirety, Masonry veneer systems are commonly used for exterior cladding, as architectural or aesthetic features on residential and commercial buildings.

As described in detail by the Masonry Veneer Manufacturers Association (MVMA), proper installation of stone on a framed building requires the installation of a weather resistant barrier (WRB), then application of a lath secured to the framing with corrosion resistant fasteners and a nominal ½ inch scratch coat. The lath must be properly applied to the wall in order to avoid intrusion of water, and to provide an acceptable structure to which the cladding will be adhered. The lath must be corrosion resistant, applied in an overlapping fashion, and with a corrosion resistant nail that penetrates the studding according to the MVMA recommendations. Additionally, the scratch coat must be applied using a correct mortar at the proper moisture content and thickness, embedded properly in the lath, allowed to cure to "thumb dry", the scratched to provide grooves, and allowed to cure. These additional products and steps add cost, additional labor and provide opportunities for human error, which can result in a poor installation and future problems. The installation of the WRB, lath and scratch coat must be performed up to 48 hours or more before the installation of the veneer product, allowing the scratch coat to properly cure. Further details are set forth by the MVMA.

Once the scratch coat is properly applied and cured, adhered concrete masonry veneer (ACMV) products are then adhered to the scratch coat using a mortar applied to the ACMV. The MVMA guidelines recommend that the scratch coat should be moist cured to prevent cracking, and that both the scratch coat and the ACMV should be "dampened" when applying the ACMV, adding additional requirements on the installer. The installer typically will take individual ACMV products, "butter" the back of each individual product with mortar, and apply the "buttered" product to the scratch coat, forcing the mortar into the scratch coat to adhere the ACMV to the wall. The consistency of the scratch coat, mortar and skill of the installer each play a role in the reliability of the installation. Additionally, the installation should not be performed during rain or cold weather, thus limiting the time available (and time delay) for completion of the building. These all add to cost and customer dissatisfaction during the construction process.

ACMV products are typically installed as discrete individual stones or brick adhered to a scratch coat on the exterior of a building as described above. Stones are typically installed from the top of the building, and the wall is covered in a downward direction. If the wall is struck (e.g. if drywall is installed on the interior of the building) before the mortar is cured, the stone may be dislodged from the wall. This creates re-work for the installer, or partially dislodged stones may become loose at a later date.

An optional installation technique described in the MVMA guidelines includes a rainscreen drainage plane system, which provides a space to permit incidental water to escape. The recommended ways to provide this space include a drainage mat, formed polymer sheeting (such as Delta®-Dry Stucco and Stone, available from Cosella-Dorken, ref. http://www.cosella-dorken.com), strapping or furring to provide the recommended MVMA air gap of 3/16 to ¾ inch. These systems allow moisture to escape from behind the veneer, but add additional material and labor cost, time and complexity during installation of the ACMV product, and are not used in many installations.

A panelized veneer product, Versetta Stone, is sold by Boral Stone, LLC. (http://masonry.owenscoming.com/versettastone). These panelized veneer products are secured to the exterior of a building using mechanical fasteners driven through a flange embedded in the top of the veneer product. These systems reduce some of the issues with the adhered ACMV products, because the lath, scratch coat and adhesive mortar can be eliminated in many installations of these panelized veneer products. However, these panelized veneer products are relatively large (typically about 8-10 inches high and approximately 32-36 inches wide) and have a limited drainage plane gap. While this enables fast installation on structures where penetrations are not present (such as windows or outlets) or corners, the presence of these penetrations on most buildings results in a large number of panels being trimmed and a fairly large amount of waste (Boral's installation instructions instructs an installer to initially estimate 10% scrap). The large number of cuts takes time and produces excess waste. Additionally, these products are more expensive to manufacture, and the designs present challenges in manufacturing.

Accordingly, it would be desirable to provide an improved product and system for installing veneer products and to eliminate the lath and scratch coat.

SUMMARY OF THE INVENTION

In accordance with the purposes of the present invention as described herein, an improved masonry veneer product ("MVP") and system ("MVS") are provided. Such a product and system includes a bracket embedded in the product, the bracket having a first end for securing the upper end of the product to a building. In one embodiment, the bracket also creates an integral air gap behind the product for the escape of moisture. The bracket may include a second end for retaining the bottom end of the product to the building through an interference fit to an adjacent MVP. The system further includes a projection between adjacent MVP to impede moisture from passing between MVP's, and a WRB installed adjacent the structure and air gap to keep moisture from entering the structure.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

Figure 1:
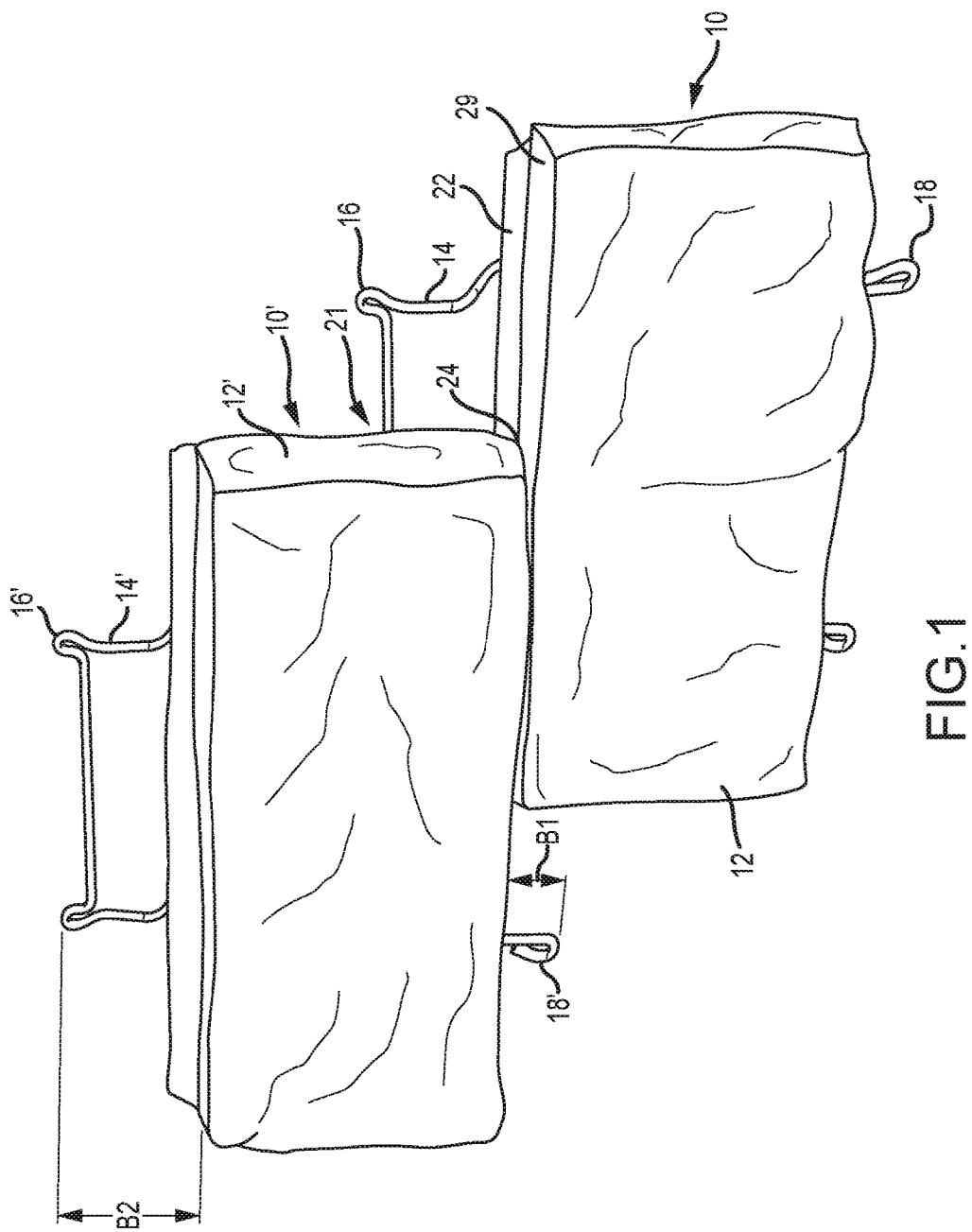
FIG. 1 provides a front view of a pair of masonry veneer products according to the present invention.

Referring now to FIG. 1 there are shown a pair of masonry veneer products 10, 10' illustrated schematically and described herein typically as a dry stack stone product body 12, similar to a typical box material in appearance. However, the new MVP and MVS have additional inventive features as described herein. The present invention could be applied to nearly any texture of manufactured stone or brick, but is primarily illustrated with a dry stack installation for the sake of simplicity (and as a representative installation). Although not illustrated, one skilled in the art appreciates that an embodiment of the present invention may be used with a grouted texture, and would preferably include a flange on one of the top and bottom of the stone and a second flange on either the left or right end, the flanges each serving as a ledge for a grouted joint. One skilled in the art could modify the current design to utilize the present invention with other textures and configurations.

Figure 4:
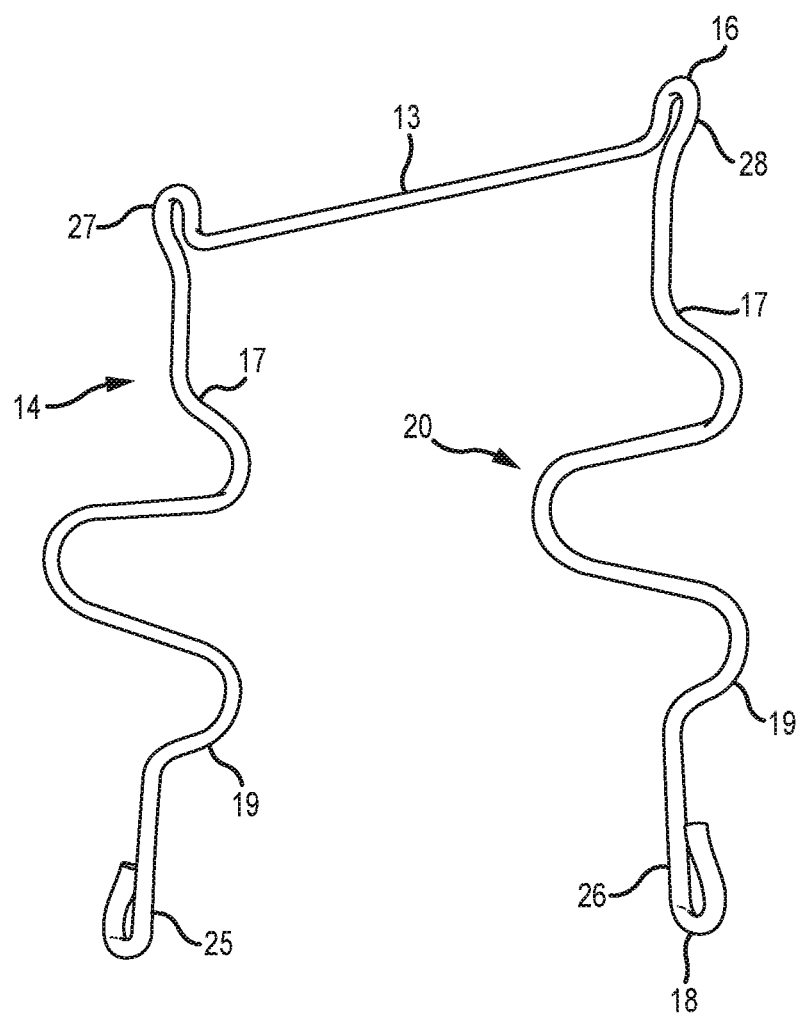
FIG. 4 provides an isometric view of a first wire retainer according to the present invention.
Figure 5:
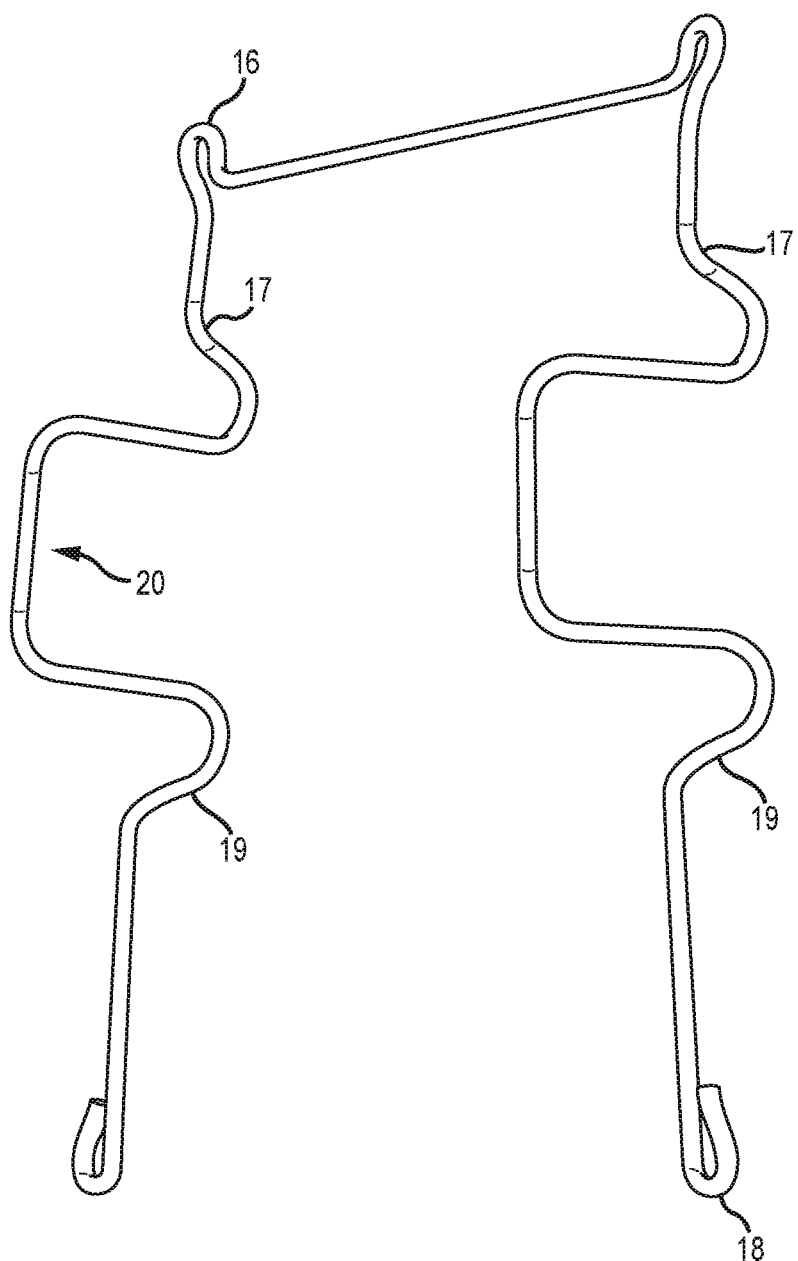
FIG. 5 provides an isometric view of a second wire retainer according to the present invention.
Figure 8:
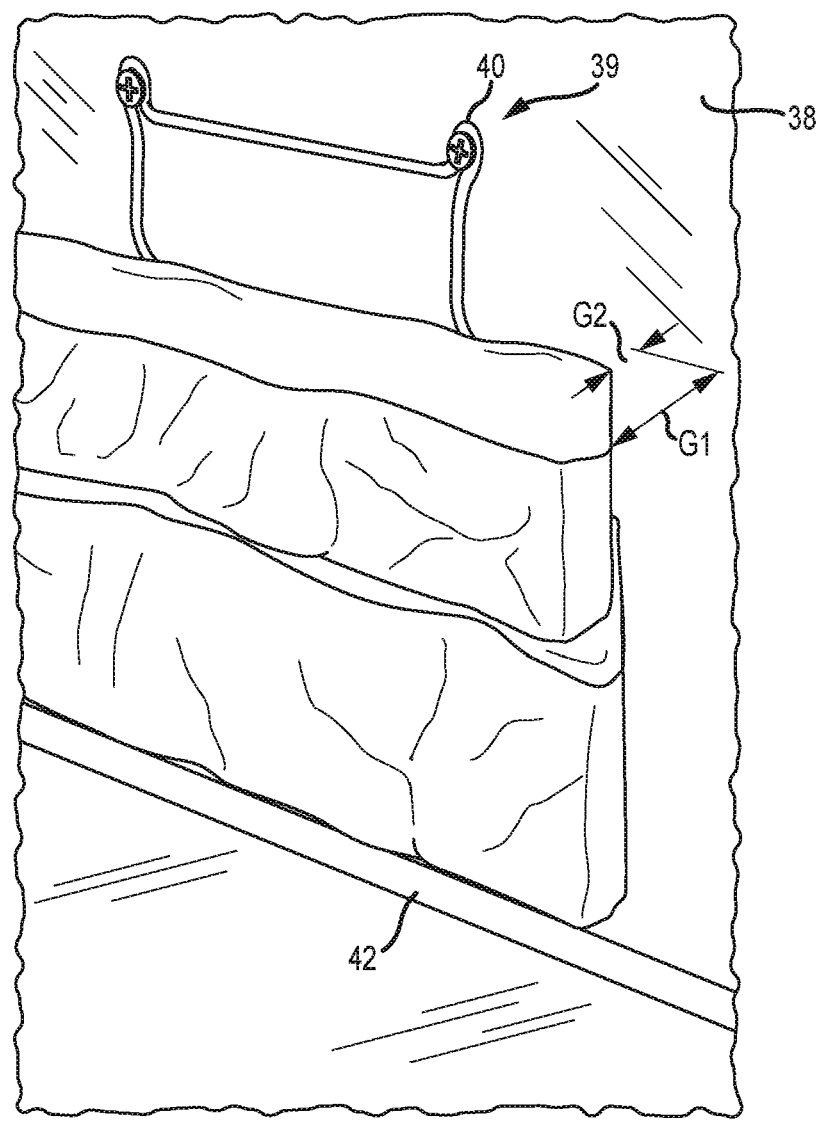
FIG. 8 provides an isometric view of a masonry veneer product installed into a starter strip over a WRB according to the present invention.

The embodiment shown in FIG. 1 includes a pair of brackets 14, 14' embedded in the product body 12. Each bracket includes a top end 16 and bottom end 18. The top end 16 is illustrated as having a looped construction forming an eye for receiving a fastener 40 as illustrated in FIG. 8. The ends 16, 18 are designed to extend and nest under an adjacent stone as illustrated in FIG. 1 at 21. Each end preferably includes a curved shape 17, 19 as illustrated in FIGS. 4 and 5 for holding the body 12 away from the wall to create an air gap for drainage and to allow for deflection of the ends 16, 18 when attached to the wall. In a preferred embodiment as illustrated in FIG. 4, the wire 14 includes two attachment eyes 25, 26 at the bottom end 18 and two attachment eyes 27, 28 at the top end 16, formed in a unitary bracket 14. A lateral connector 13 is provided to enable the formation of the bracket into a single piece, preferably as a unitary construction, to enable efficient manufacture of the product 10. Although shown connecting the top ends 16, another embodiment includes a connector for connecting the bottom ends or intermediate portions 20.

Figure 3:
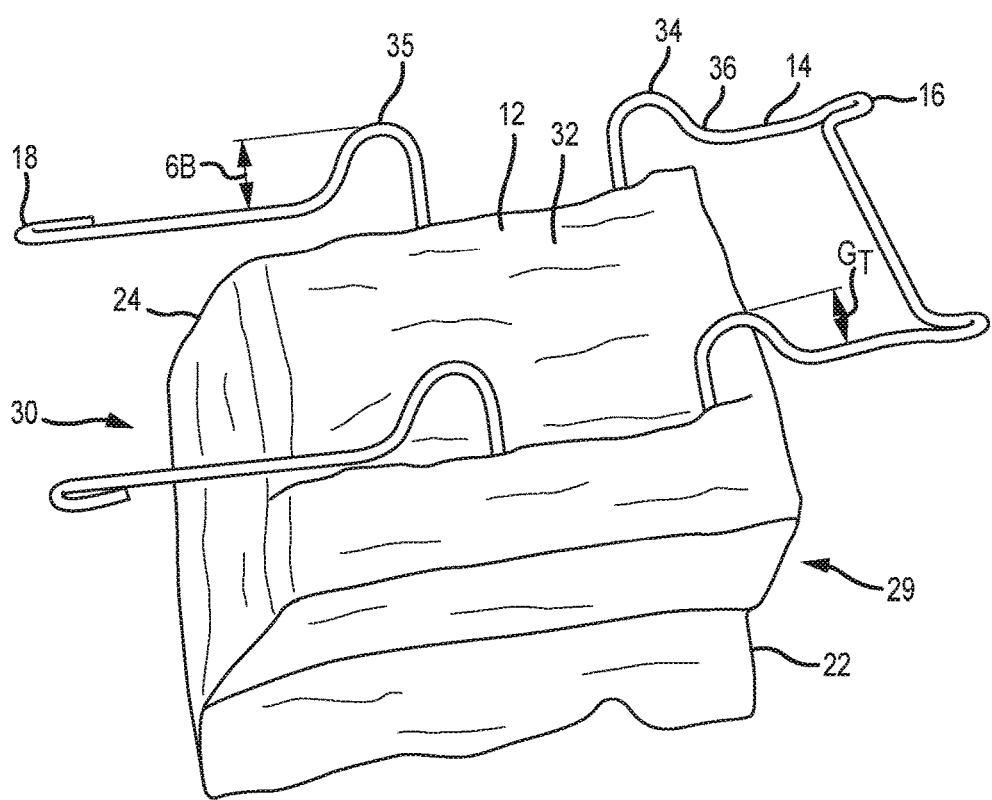
FIG. 3 provides an isometric view of a masonry veneer product according to the present invention.

As further illustrated in FIG. 3, the bracket 14 is embedded into the stone body 12, with an intermediate portion 20 as shown in FIGS. 4 and 5. The intermediate portion 20 is embedded in the product body 12 a depth sufficient to ensure adequate engagement to support the stone body 12 when attached to a building (not shown), preferably for the life of the building. The depth and shape may affect the pullout strength, and should be coordinated with the size, shape and weight of the product. In a preferred embodiment, the embedded depth is approximately ¾-1 inch, but may be more or less depending on the surface area of the bracket, the characteristics of the body composition, and the size and shape of the body. In one embodiment the depth is ½ inch. In a heavier product, the depth may be 1.5 inch or more, depending on requirements. The brackets 14 penetrate the stone body 12 to a depth that provides sufficient engagement between the bracket and cured concrete stone, but also which retains a thickness of concrete that will ensure the face of the stone body 12 does not expose the wire or fracture during the life of the building. The brackets 14 are preferably formed from a wire that is corrosion resistant, such as a stainless steel or galvanized steel, and having sufficient strength and sufficient stiffness to not deform and to provide the installation with an interference fit at the bottom as described below. The bracket 14 should be rigid enough to withstand handling, packaging, transport and installation without excessive deformation. In another embodiment, the brackets 14 are formed from a fiberglass material, or any material known to one skilled in the art that is not corroded and will support the masonry product 10. In yet another embodiment (not shown), the brackets 14 are stamped from sheet metal or formed or molded from another non-corrosive material in a more flattened cross section. One skilled in the art appreciates the bracket preferably has adequate strength and shape retention or memory.

As shown in the embodiment illustrated in FIGS. 1 and 3, the product may include water shedding feature, which is described herein to include a flashing lip 22 along the top surface 29 of the stone body 12. This lip 22 is intended to inhibit the passage of moisture, such as wind driven rain, between the stone body 12 and an adjacent stone 10' as illustrated in FIG. In such an embodiment, each stone body 12 may also include a corresponding recess 24 on the bottom surface 30 of the stone body 12 to correspond with the opposing lip 22 of the adjacent stone. This lip 22 and recess 24 also serve to obscure a view of the WRB installed beneath the stone to create a visually appealing dry stack installation. It also enables easier leveling during installation.

Although not illustrated here, the lip 22 may contact the body within the recess, thereby setting the gap between the products. In a similar manner, each stone preferably includes a lip along one end of the stone body, and a corresponding recess along the opposite end of the stone body, which will inhibit moisture intrusion, obscure visibility behind the product, and set the side to side gap.

While the lip and recess 22, 24 are illustrated in FIGS. 1 and 3 as an angled or chamfered protrusion and recess, one skilled in the art appreciates that while not illustrated as such, the lips 22, 24 could be simple ridge, a rabbet, shiplap, or other type of configuration that provides a moisture block and an improved line of sight.

As illustrated in the embodiment of FIG. 3, the bracket 14 includes a first protrusion 34 formed in the bracket 14. The protrusion extends below the back surface 32 of the stone body 12 to bear against the structure 39 illustrated in FIG. 9 and create an air gap G1 under the product 10 when installed on a structure, preferably installed over a WRB 38. In the illustrated embodiment, the bracket 14 includes a bend 36 which holds the top end 16 away from the structure 39 and WRB 38 to create a second gap G2. When the bracket 14 is secured through the WRB 38 to the structure 39 as illustrated in FIG. 8, the top end is urged by the fastener 40 toward the structure.

This force on the top end 16 acts as a lever, which urges the opposite second end 18 of the bracket 14 away from the structure 39 and toward the back surface 32' of a second body, such as an adjacent product 10', or into a channel on e.g. a starter strip 42. Because the second end 18 is wedged below the lower product 10', this causes a second protrusion 35 at the bottom end 18 to be held securely against the structure 39 and therefore the product is secured both at the top by the nail and at the bottom by a wedging action against the second product 10'. In a preferred embodiment, the top end is positioned approximately ⅛ inch further away from the structure to ensure the wedging action occurs. This dimension can be modified depending on the stiffness of the wire and the surface against which it bears to provide a gap greater than the height off the wall to enable a cam locking action.

As illustrated in FIG. 3, in a preferred embodiment, the gap under the top GT is approximately ½ inch and the gap under the bottom GB is approximately ⅜ inch. One skilled in the art appreciates this dimension may be modified based on the air gap desired, concrete penetration and the deformation of the bracket 14. As illustrated in FIG. 1 the top end 16 preferably extends a distance B2 above the body 12 and bottom end 18 extends a distance B1 below the body 12. In a preferred embodiment B1 extends approximately ½ inch further than B2. In one embodiment B1 is approximately 1⅝ inch and B2 is approximately 1⅛ inch. In another embodiment, B1 is approximately 1¼ inch and B2 is approximately ¾ 1 inch. One skilled in the art appreciates this dimension may be changed to increase or decrease overlap depending on the nature of the wire, the size of the stone, and other manufacturing and installation factors, and in some embodiments, the dimensions may be the same or opposite to reflect the overall design requirements. One skilled in the art appreciates that the overlap can be lengthened to the height of the stone or more if designed with no interference, and greater overlap may provide a more stable wall.

Figure 2:
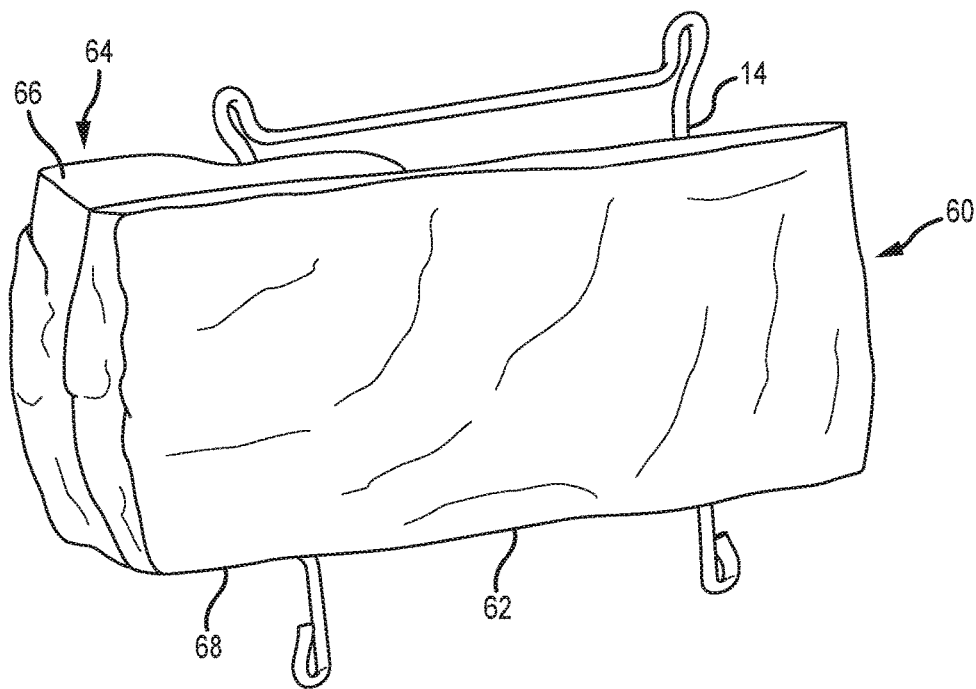
FIG. 2 provides a front view of a corner masonry veneer product according to the present invention.
Figure 2A:
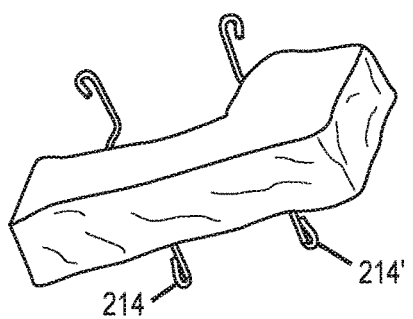
FIGS. 2A and 2B provide isometric views of a drip ledge corner product according to the present invention.

In another embodiment (not illustrated), the top end of the bracket 14 does not have a bend 36, and the bottom end 18 of the bracket is bent to lie in a plane above the back surface 32 of the stone body 12, so the bottom end 18 is installed under an adjacent product (not shown) simply using an interference fit. This interference may be at least 1 mm and could be 2, 3, 4, or 5 mm or more, depending on the stiffness of the bracket. Accordingly, the configuration of the bottom bracket illustrated in FIG. 2 may be used with or without the bent configuration of the top end 16 as illustrated in FIG. 2. Additionally, the second end 18 may be wedged against another body, such as a starter strip or an accessory, such as a ledge. In certain applications, it may be sufficient to fasten the second end using adhesives, nails, stapes, screws or the like as a substitute for the second body. While the protrusions are illustrated herein as bent wires, one skilled in the art appreciates that a different configuration could include a molded protrusion, a weldment, or other configurations to provide the desired gap.

A system including the product 10 described above preferably includes a building structure 39 such as a frame and sheathing or concrete structure, a weather resistant barrier 38 installed over the structure (similar in nature and installation to that specified by the MVMA), a plurality of products 10 attached to the structure over the WRB 38 and attached to the structure 39 using fasteners 40 projecting through the brackets 14. The fasteners 40 are preferably non-corrosive, such as galvanized roofing nails, screws or staples; provided however that the fasteners must provide sufficient strength to secure the product 10 to the structure 39 for the life of the structure.

Figure 9:
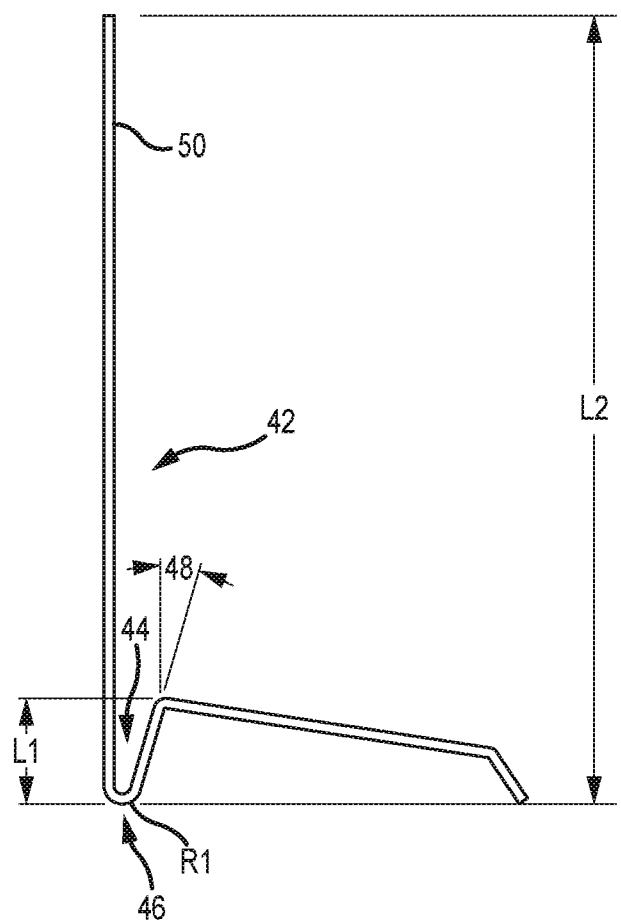
FIG. 9 provides an end view of a starter strip profile according to the present invention.

In one embodiment, installation begins from the bottom of the building. In such an instance, a starter strip 42 is installed to the building in a level manner. A preferred starter strip is illustrated in FIG. 9. The starter strip 42 preferably includes a recess 44 to receive the bottom 18 of the brackets 14. The starter strip preferably includes weep holes 46 at the bottom of the recess 44 to enable water to drain. The recess 44 preferably includes a lead angle 48 to enable easy installation of the bracket 14 and preferably narrows to a line to line or interference fit to wedge the bracket 14 and hold it in place. In one embodiment, the lead angle is approximately twenty degrees, and the recess has a bottom radius R1 of 0.06 inch for a 0.12 diameter wire, and a depth L1 of approximately ½ inch. Products having characteristics similar to the starter strip are also preferably used as flashing around windows and other openings. The starter strip 42 is preferably made from galvanized steel, aluminum, PVC or any common noncorrosive building material used in similar applications. Furthermore, the bottom of the bracket may experience bending and wedging as the bottom legs are fit into the recess of the starter strip and the brackets are secured to the wall.

The starter strip 42 also includes a back portion 50 which extends under the WRB 38 to ensure water does not enter under the WRB, to comply with ASTM requirements. In a preferred embodiment the back portion 50 has a height L2 of 3.5 inches to satisfy ASTM. In another embodiment, 2 inches may be sufficient. The overlap may be less in some situations or may be more, but practicality limits one is normally acceptable. In another embodiment, a simple j-channel or other starter is used with the products 10 of the present invention. Similarly, one skilled in the art appreciates that either a starter strip or weep screed should provide ventilation at the bottom, and therefore accommodations should be made to provide for air passage. Once the first row is secured to the wall using the starter strip 42 and the top end 16 of the brackets is secured as described above, the second row is installed by inserting the bottom ends 18 of the second row of products behind the rear surface 32 of the first row of products previously installed. Then the top end of successive rows of the product being installed is pushed against the structure 39 and secured at the top end 16 as described above.

The top row of the product may be capped or may extend to the soffit. It is desirable to include an air gap where possible to provide for air flow. Where water drainage does not permit this, MVMA details may be followed. Where the product extends to the soffit, an installation similar to typical brick installation may be performed, i.e. the soffit may be installed after the product is installed. Alternatively the soffit j-channel may include a spacer against the wall to provide for air flow at the top of the wall.

Although not illustrated, in one embodiment, after the product is secured to the structure, a bead of caulk or other material is optionally installed on the product along one of the top and bottom, plus one of the ends, so that the joint between adjacent products is filled with the material to provide a substantially effective water seal. In yet another embodiment, a bead of caulk or foam dam is provided on the top or bottom and one end of each stone at the factory to provide a substantially watertight joint between adjacent products without a field-applied caulk.

One skilled in the art appreciates that while not illustrated here, a grout product may optionally be installed between adjacent products for certain textures. Such a grout is preferably flexible, so that it can perform for an extended period without cracking. Such a grout is also preferably water resistant to minimize the amount of water that enters between adjacent products. Additionally, a grout may be used with the flanged design described above.

As illustrated in FIG. 3, the product 10 preferably includes a single bracket 14, but one skilled in the art appreciates that more than one bracket may be utilized to provide additional support and attachment, or to facilitate manufacture. The nature of the product (size, weight) and the nature of the brackets, fasteners and structure and environment can affect these requirements.

As illustrated in FIGS. 2, 2A 6 and 7, the invention is also applied to corners and accessories, such as drip ledge corners, trim stones, keystones, ledges, light fixtures, outlets, column wraps and other products. In the case of corners, in one embodiment shown in FIG. 2, only one side of the stone corners are attached to the structure, and a spacer is provided on the backside of the return to provide a consistent air gap and exterior thickness. As shown in FIG. 2, the corner 60 includes a long leg 62 and a return leg 64. The bracket 14 is used to attach the long leg 62 to the building and the short leg 64 is supported as part of the body. While the corner 60 is illustrated with the top 66 installed so the return is on the left side, the corner 60 could be inverted so the bottom 68 is installed upwardly so the return 66 is on the right side of the corner 60. Thus, the corners 60 are reversible. Preferably the reversible corners have a reversible clip that is embedded in the concrete to allow for ease of ordering materials, using as left and right corners and staggered joints during installation to give a more authentic stone look.

Figure 2B:
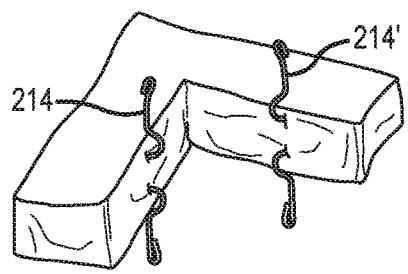
Figure 6:
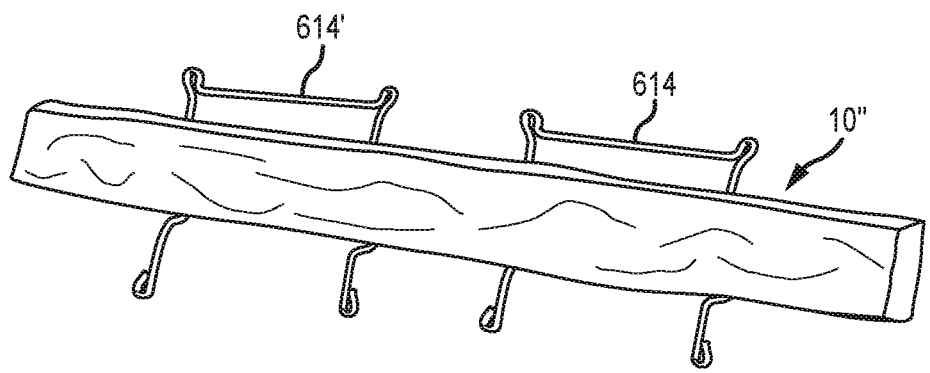
FIG. 6 provides an isometric view of a masonry veneer product according to the present invention having a long width dimension.
Figure 7:
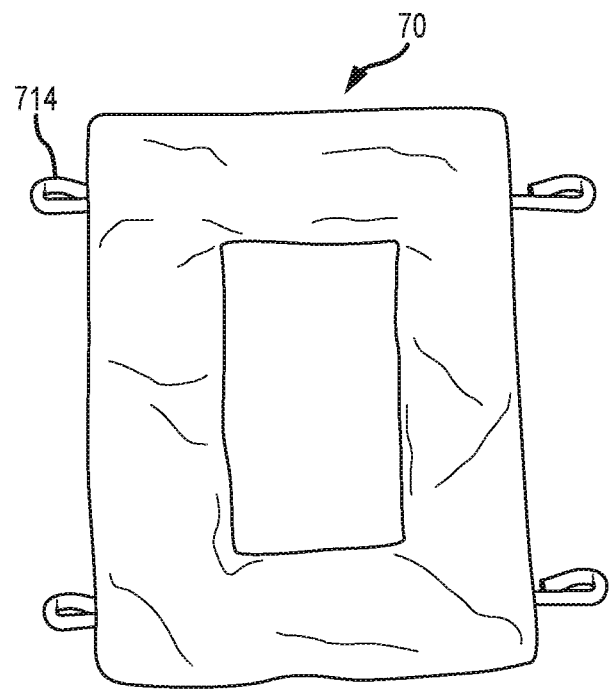
FIG. 7 provides an isometric view of a masonry veneer product according to the present invention useful as an accessory.

As illustrated in FIG. 2B, a corner may include two wires 214, 214' to ensure both legs are sufficiently supported. In this example, the corner may be a ledge corner. In a similar manner, FIG. 6 illustrates an elongate product 10" having two brackets 614, 614' to support the elongate product. While not limiting, in this illustration, the elongate product 10" may comprise a ledge piece. FIG. 7 illustrates another accessory piece 70 including brackets 714 according to the principles of this invention. Referring to FIGS. 7 and 2B, one skilled in the art appreciates that one can use single or double clips or a combination of single and double clips and can be installed in vertical or horizontal configurations. This principal can be applied to other accessories including trim stones, surrounds, drip ledge corners, light boxes and other accessories.

In another embodiment, the installation instructions teach the installer to set a gap manually, or to use separate spacers, such as foam or molded parts. In another embodiment, the instant invention is applied to a panelized product. In such a case, it may be necessary to utilize a greater number of brackets to adequately support and secure the panelized product due to its size and weight.

One embodiment of the present invention is applied to individual stones or bricks. This makes installation simple, as fewer products will be cut and less scrap created. Furthermore, it avoids the potential that an installer will align the panels to create unsightly lines or an unattractive panelized wall. Additionally, the individual products also make it simpler to create accessory products that are compatible with this system. As noted above, however, applicant envisions that a panelized system could utilize the present invention, either alone or in combination with the individual products as described above.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A veneer product adapted for attachment to a building, comprising:
    a body having a front surface, a back surface, a top side, and a bottom side; and
    a bracket embedded within the body, the bracket further comprising:
        a pair of first ends adjacent the top side adapted for attachment to the building and a pair of first protrusions for positioning the back surface a first predetermined distance from the building,
    a pair of second ends each having a second protrusion for positioning a second portion of the back surface a second predetermined distance from the building and a lower projection adjacent the bottom side adapted for engagement with a second body to retain the bottom side of the veneer product, and
    a connector for connecting one of the two pairs of ends.

2. The veneer product of claim 1, wherein each of the first ends is adapted to receive a fastener.

3. The veneer product of claim 1, further comprising a lip provided on one of the top side and the bottom side of the body.

4. The veneer product of claim 1, wherein the veneer product further comprises a left end and a right end, and wherein the veneer product further comprises a lip provided on one of the left end and the right end.

5. The veneer product of claim 1, wherein the building comprises a weather resistant barrier attached to an exterior surface thereof, and the veneer product is installed over the weather resistant barrier, wherein the first predetermined distance and the second predetermined distance defines a gap between the weather resistant barrier and the back surface of the body.

6. The veneer product of claim 1, wherein the first predetermined distance is not equal to the second predetermined distance.

7. A veneer product adapted for attachment to a building, comprising:
   a body having a front surface, a back surface, a top side, and a bottom side;
   a bracket embedded in the body, the bracket further comprising:
      a pair of first portions extending from the back surface, the pair of first portions having first ends adjacent the top side adapted for attachment to the building, and the pair of first portions also having a pair of first protrusions configured to position the back surface a first predetermined distance from the building,
      a pair of second portions extending from the back surface, the pair of second portions each having a second protrusions configured to position a second portion of the back surface a second predetermined distance from the building and a lower projection adjacent the bottom side adapted for engagement with a second body to retain the bottom side of the veneer product, and
      a member that connects the pair of first portions.

8. The veneer product of claim 7, wherein each of the first ends includes an eye for receiving a fastener.

9. The veneer product of claim 7, further comprising a lip provided on one of the top side and the bottom side of the body.

10. The veneer product of claim 7, wherein the veneer product further comprises a left end and a right end, and wherein the veneer product further comprises a lip provided on one of the left end and the right end.

11. A veneer product adapted for attachment to a building, comprising:
   a body having a front surface, a back surface, a top side, and a bottom side;
   a first bracket embedded within the body, the first bracket comprising:
      a first end adjacent the top side adapted for attachment to the building and a first protrusion for positioning the back surface a first predetermined distance from the building, and
      a second end having a second protrusion for positioning a second portion of the back surface a second predetermined distance from the building and a second projection adjacent the bottom;
   a second bracket embedded with the body, the second bracket comprising:
      a first end adjacent the top side adapted for attachment to the building and a first protrusion for positioning the back surface a first predetermined distance from the building, and
      a second end having a second protrusion for positioning a second portion of the back surface a second predetermined distance from the building and a second projection adjacent the bottom; and
   a member that interconnects the first end of the first bracket to the first end of the second bracket.

12. The veneer product of claim 11, wherein the first end of the first bracket and the first end of the second bracket each include an eye for receiving fasteners.

13. The veneer product of claim 11, wherein the first end of the first bracket and the first end of the second bracket each extend above the top side a first distance and the second end of the first bracket and the second end of the second bracket each extend below the bottom side a second distance, wherein the second distance is about 0.5 inches greater than the first distance.

14. The veneer product of claim 11, further comprising a lip provided on one of the top side and the bottom side of the body.

15. The veneer product of claim 11, wherein the body is a corner piece wherein the back surface is comprised of two orthogonally-opposed surfaces.

16. The veneer product of claim 11, wherein a portion of the first bracket embedded within the body is located between the first protrusion and the second protrusion thereof, and wherein a portion of the second bracket embedded within the body is located between the first protrusion and the second protrusion thereof.

17. The veneer product of claim 16, wherein the portion of the first bracket embedded within the body has an arcuate portion, and the portion of the second bracket embedded within the body has an arcuate portion.

18. The veneer product of claim 16, wherein the portion of the first bracket embedded within the body has a linear portion, and the portion of the first bracket embedded within the body has a linear portion.

19. The veneer product of claim 11, wherein the building comprises a weather resistant barrier attached to an exterior surface thereof and the veneer product is installed over the weather resistant barrier, wherein the first predetermined distance and the second predetermined distance defines a gap between the weather resistant barrier and the back surface of the body.

20. The veneer product of claim 19, wherein the first predetermined distance is not equal to the second predetermined distance.

21. The veneer product of claim 11 wherein the second end of the first bracket and the second end of the second bracket are adapted to be secured by a starter strip secured to the building.

22. The system of claim 21, wherein the starter strip includes a recess to retain the second end of the first bracket and the second bracket.

23. The veneer product of claim 22, wherein the recess includes at least one weep hole.

* * * * *